United States Patent
Gupta et al.

(10) Patent No.: US 9,359,996 B2
(45) Date of Patent: Jun. 7, 2016

(54) VARIABLE WIND TURBINE HAVING A POWER DISSIPATING UNIT; A METHOD OF OPERATING A POWER DISSIPATING UNIT IN A WIND TURBINE

(75) Inventors: Amit Kumar Gupta, Singapore (SG); Gert Karmisholt Andersen, Hovedgård (DK); Swee Yee Fonn, Singapore (SG); Bing Li, Singapore (SG)

(73) Assignee: Vestas Wind Systems A/S, Aarhus N (DK)

( * ) Notice: Subject to any disclaimer, the term of this patent is extended or adjusted under 35 U.S.C. 154(b) by 142 days.

(21) Appl. No.: 14/114,249

(22) PCT Filed: Apr. 19, 2012

(86) PCT No.: PCT/DK2012/050131
§ 371 (c)(1),
(2), (4) Date: Jan. 13, 2014

(87) PCT Pub. No.: WO2012/146250
PCT Pub. Date: Nov. 1, 2012

(65) Prior Publication Data

US 2014/0145440 A1     May 29, 2014

Related U.S. Application Data

(60) Provisional application No. 61/479,853, filed on Apr. 28, 2011.

(30) Foreign Application Priority Data

Apr. 28, 2011   (DK) .................................. 2011 70202

(51) Int. Cl.
*F03D 9/00*     (2006.01)
*F03D 7/00*     (2006.01)
(Continued)

(52) U.S. Cl.
CPC   *F03D 9/003* (2013.01); *F03D 7/00* (2013.01); *F03D 7/028* (2013.01); *F03D 7/0264* (2013.01);
(Continued)

(58) Field of Classification Search
CPC ..... F03D 7/028; F03D 7/0264; F03D 7/0284; F03D 7/00; F03D 9/003; H02J 3/386; H02P 3/22
See application file for complete search history.

(56) References Cited

U.S. PATENT DOCUMENTS 7,613,548 B2 * 11/2009 Cardinal et al. .............. 700/286
2002/0190695 A1   12/2002 Wall et al.
(Continued)

FOREIGN PATENT DOCUMENTS

| EP | 1672779 A2 | 6/2006 |
| EP | 1863162 A2 | 12/2007 |
| EP | 2096299 A2 | 9/2009 |

OTHER PUBLICATIONS

Danish Search and Exam Report, PA 2011 70202, Jan. 23, 2012.
(Continued)

*Primary Examiner* — Tulsidas C Patel
*Assistant Examiner* — Viet Nguyen
(74) *Attorney, Agent, or Firm* — Patterson + Sheridan LLP (57) ABSTRACT

A variable speed wind turbine is provided. The variable speed wind turbine comprises a generator, a power converter for converting at least a portion of electrical power generated by the generator, the power converter comprising a generator-side converter, a grid-side converter and a DC (direct current) link therebetween, a power dissipating unit operatively coupled to the DC-link, and a controller. The controller is adapted to receive a request to reduce power output from the wind turbine, determine a feed forward power signal based on a reference generator power and a desired turbine power, and operate the power dissipating unit based on the feed forward power signal.

7 Claims, 6 Drawing Sheets

(51) Int. Cl.
*F03D 7/02* (2006.01)
*H02J 3/38* (2006.01)
*H02P 3/22* (2006.01)
*H02P 101/15* (2015.01)

(52) U.S. Cl.
CPC .............. *F03D 7/0284* (2013.01); *H02J 3/386* (2013.01); *H02P 3/22* (2013.01); *F05B 2270/1033* (2013.01); *H02P 2101/15* (2015.01); *Y02E 10/723* (2013.01); *Y02E 10/763* (2013.01)

(56) References Cited

U.S. PATENT DOCUMENTS

| | | | | |
|---|---|---|---|---|
| 2006/0132994 | A1* | 6/2006 | Delmerico et al. | 361/20 |
| 2007/0052244 | A1* | 3/2007 | Hudson | 290/44 |
| 2007/0216163 | A1* | 9/2007 | Guang et al. | 290/44 |
| 2008/0296897 | A1* | 12/2008 | Kovach et al. | 290/44 |
| 2009/0187282 | A1* | 7/2009 | Menke et al. | 700/287 |
| 2009/0206606 | A1* | 8/2009 | Jorgensen et al. | 290/44 |
| 2009/0218819 | A1* | 9/2009 | Miller | F03D 9/003 290/44 |
| 2009/0224704 | A1* | 9/2009 | Ibori et al. | 318/376 |
| 2009/0261588 | A1* | 10/2009 | Von Mutius et al. | 290/44 |
| 2010/0002475 | A1* | 1/2010 | Folts et al. | 363/37 |
| 2010/0138058 | A1* | 6/2010 | Kirchner et al. | 700/286 |
| 2011/0025059 | A1* | 2/2011 | Helle et al. | 290/44 |
| 2011/0089693 | A1* | 4/2011 | Nasiri | 290/44 |
| 2011/0106325 | A1* | 5/2011 | Opina et al. | 700/287 |
| 2011/0163546 | A1* | 7/2011 | Gupta et al. | 290/44 |
| 2011/0222320 | A1* | 9/2011 | Delmerico et al. | 363/37 |
| 2011/0260661 | A1* | 10/2011 | Vilar | 318/380 |
| 2012/0326649 | A1* | 12/2012 | Patanaik et al. | 318/453 |

OTHER PUBLICATIONS

International Search Report, PCT/DK2012/050131, Oct. 18, 2013.

* cited by examiner

VARIABLE WIND TURBINE HAVING A POWER DISSIPATING UNIT; A METHOD OF OPERATING A POWER DISSIPATING UNIT IN A WIND TURBINE

FIELD OF THE INVENTION

The present invention relates generally to a wind turbine, and in particular, to a method for operating a power dissipating unit in a wind turbine.

BACKGROUND OF THE INVENTION

A wind turbine is an energy conversion system which converts kinetic wind energy into electrical energy for utility power grids. Specifically, wind incident on blades of the wind turbine generator (WTG) causes a rotor of the WTG to rotate. The mechanical energy of the rotating rotor in turn is converted into electrical energy by an electrical generator. Because wind speed fluctuates, the force applied to the WTG blades and hence the rotational speed of the rotor/generator can vary. Power grids however require a constant frequency electrical power to be generated by the wind turbine.

One type of wind turbine that provides constant frequency electrical power is a fixed-speed wind turbine. This type of wind turbine requires a generator rotor that rotates at a constant speed. A disadvantage of such fixed-speed wind turbine is that it does not harness all of the wind's energy at different speeds and must be disabled at low wind speeds. Another type of wind turbine is a variable speed wind turbine. This type of wind turbine allows the generator to rotate at variable speeds to accommodate for fluctuating wind speeds. By varying the rotating speed of the generator rotor, energy conversion can be optimized over a broader range of wind speeds.

A full scale power converter based wind turbines (which is a type of variable speed wind turbine) usually includes a power converter having a generator side converter coupled to a grid side converter via a direct current (DC) link. The generator side converter regulates the power of the generator. This power passes through the DC-link, and is eventually fed to the grid through the grid side converter. The grid side converter regulates the grid side power. The same is true for the Doubly Fed Induction Generator (DFIG) systems where only a portion of the power from the generator passes through the power converter.

A wind turbine may be requested to shut down, for example due to a fault in the grid, component failure in the turbine/wind farm or requested by the grid operator. When the wind turbine reduces its power during shut down, the power produced by the wind turbine decreases to zero at a specified rate. The rate of decrease of power, commonly called the power ramp down rate, is dependent on the power ramp down rate of the generator. How fast the turbine power can decrease during a shut down is normally limited by the maximum ramp down rate of the generator e.g. 0.2 pu/sec.

However, certain grid codes/utilities may require the turbine to ramp down at a rate faster than the maximum ramp down rate of the turbine/generator e.g. 0.4 pu/sec. It is also foreseen that some countries may specify in their grid code requirements a minimum ramp down rate of turbines during shut down.

Hence it is desirable to provide a method of operating a wind turbine to provide a ramp down rate which is higher than the maximum ramp down rate of the turbine or generator.

SUMMARY OF THE INVENTION

According to a first aspect of the invention, a variable speed wind turbine is provided. The variable speed wind turbine comprises a generator, a power converter for converting at least a portion of electrical power generated by the generator, the power converter comprising a generator-side converter, a grid-side converter and a DC (direct current) link therebetween, a power dissipating unit operatively coupled to the DC-link, and a controller. The controller is adapted to receive a request to reduce power output from the wind turbine, determine a feed forward power signal based on a reference generator power and a desired turbine power, and operate the power dissipating unit based on the feed forward power signal.

According to a second aspect of the invention, a method of operating a power dissipating unit in a wind turbine is provided. The power dissipating unit is operatively coupled to a power converter for converting at least a portion of electrical power generated by a generator. The method comprises receiving a request to reduce power output from the wind turbine, determining a feed forward power signal based on a reference generator power and a desired turbine power, and operating the power dissipating unit based on the feed forward power signal.

According to a third aspect of the invention, a method of operating a wind turbine is provided. The method comprises receiving a request to reduce power output from the wind turbine, decreasing an amount of electrical power generated by the wind turbine, and controlling a power dissipating unit operatively coupled to a power converter of the wind turbine, such that the power output from the wind turbine is decreased at a desired rate.

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

A generator is an electromechanical machine capable of converting mechanical energy into electrical energy. The generator used in a wind turbine could be any type of generator including but not limited to, a permanent magnet generator, doubly-fed induction generator and squirrel cage induction generator. The electrical power from the generator has a variable frequency due to the variable rotational speed of the rotor. A portion or all of the electrical energy or power generated by the generator is converted by a power converter into a fixed frequency electrical power suitable to be supplied to a power grid or a load.

The load may be a DC (direct current) or an AC (alternating current) load. For supplying power to the grid, the power converter converts the electrical power with variable frequency into electrical power having a fixed frequency required by the grid. Specifically, a generator-side converter converts at least a portion of power from the generator and passes it to the grid through the grid-side converter. When supplying power to a load, for example a DC load, the DC power may be obtained from a DC-link between the generator-side converter and the grid-side converter. The power dissipating unit is coupled to the DC-link of the power converter. The power dissipating unit may also be known as a chopper circuit, and can dissipate power at the DC-link.

A controller is adapted to receive a request to reduce or ramp down the power output from the wind turbine, determine a feed forward power signal and operate the power dissipating unit based on the feed forward power signal. This request to reduce or ramp down the power output may be a shut down signal for shutting down the wind turbine.

The feed forward power signal is determined based on a reference generator power and a desired turbine power. The reference generator power may be based on a power profile of the generator and includes a ramp down power profile of the generator. This power profile may be provided by the generator manufacturer. It can also be obtained from experiments such as operating the generator and tracking the power outputs of the generator at various conditions. The reference generator power may be an instantaneous generator power of the power profile of the generator.

The desired turbine power may be based on a desired power profile of the output of the wind turbine. The desired power profile includes a ramp down power profile at the turbine output at a required/desired ramp down rate. This required power ramp down rate at the turbine output may be based on requirements from grid codes. It may also be defined or specified by a user or operator. For example, a grid code may require that a turbine be able to ramp down its power at 0.4 pu/sec. The desired turbine power may be an instantaneous turbine power output of the desired power profile of the turbine.

The feed forward power signal determined based on the reference generator power and the desired turbine power is used to control the operation of the power dissipating unit. It should be noted that under normal operating condition of the wind turbine, the output power of the wind turbine is almost the same as the output power of the generator. Hence the power profile of the turbine output may also be taken as the reference generator power according to an embodiment.

According to an embodiment, the power dissipating unit comprises at least a switch and a resistor. The power dissipating unit is turned on by closing the switch. The switch may be a power semiconductor device such as an Integrated Gate Bipolar Transistor (IGBT) which can be turned on or off by a suitable gate voltage through a gate driver. Other power semiconductor devices or switches are possible. In alternative embodiments, the power dissipating unit may include at least a switch and at least one of a resistor, an inductor or a capacitor.

According to an embodiment, the feed forward power signal is the difference between the reference generator power and the desired turbine power. Specifically, at a given time t, the instantaneous value of the desired turbine power is subtracted from the actual instantaneous value of the generator power to generate the feed forward power signal. As mentioned earlier, since the output power of the turbine is similar to the output power of the generator, the feed forward power signal may be generated by subtracting the desired turbine power from the actual turbine power.

According to an embodiment, the controller is adapted to operate the power dissipating unit by determining a duty ratio for activating the power dissipating unit. The duty ratio refers to the percentage of time period the power dissipating unit is activated or turned on in one cycle. The duty ratio has a value from 0 to 1. When the duty ratio is 0, the power dissipating unit is turned off completely, and when the duty ratio is 1, the power dissipating unit is turned on for the whole duty cycle. When the duty ratio is 0.7, the power dissipating unit is turned on for 70% of the duty cycle (it is off for 30% of the remaining duty cycle).

According to an embodiment, the controller is adapted to generate the duty ratio by determining power to be dissipated by the power dissipating unit, determining a maximum power that can be dissipated by the power dissipating unit, and determining the ratio of the power to be dissipated and the maximum power, thereby obtaining the duty ratio. The power to be dissipated by the power dissipating unit is determined based on the feed forward power signal. If the power to be dissipated exceeds the maximum amount of power that can be dissipated by the power dissipating unit, the duty ratio will be 1. In a further embodiment, the power dissipating unit is designed such that the maximum amount of power that can be dissipated by the power dissipating unit is always larger than the power that needs to be dissipated.

It should be noted that a person skilled in the art would readily recognize that any features described above could also be used in conjunction to the method of operating a power dissipating unit according to the second aspect of the invention, and to the method of operating a wind turbine according to the third aspect of the invention.

Figure 1:
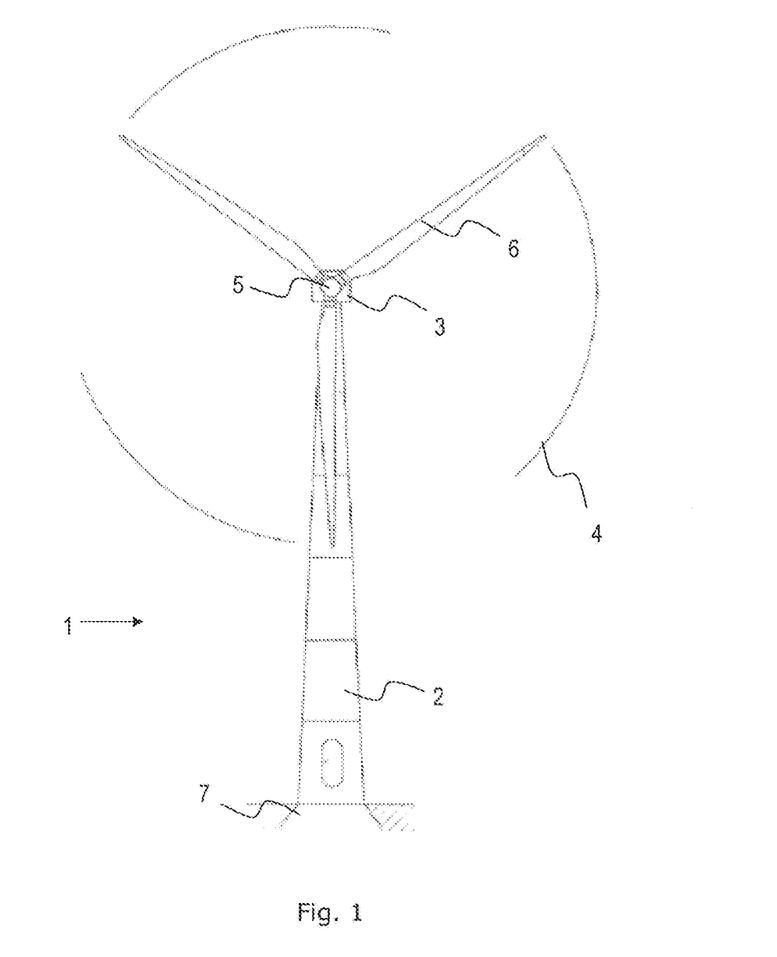
FIG. 1 shows a general structure of a wind turbine.

FIG. 1 shows a general setup of a wind turbine 1. The wind turbine 1 includes a tower 2 having a number of tower sections, a nacelle 3 positioned on top of the tower 2, and a rotor 4 extending from the nacelle 3. The tower 2 is erected on a foundation 7 built in the ground. The rotor 4 is rotatable with respect to the nacelle 3, and includes a hub 5 and one or more blades 6. Wind incident on the blades 6 causes the rotor 4 to rotate with respect to the nacelle 3. The mechanical energy from the rotation of the rotor 4 is converted into electrical energy by a generator (not shown) in the nacelle 3. The electrical energy is subsequently converted into a fixed frequency electrical power by a power converter to be supplied to a power grid. The wind turbine may also form part of a wind farm or a wind power plant comprising a plurality of wind turbines. All the electrical power generated by the individual wind turbines in the wind farm are consolidated and supplied to the power grid via a Point of Common Coupling (PCC).

Although the wind turbine 1 shown in FIG. 1 has three blades 6, it should be noted that a wind turbine may have different number of blades. It is common to find wind turbines having two to four blades. The wind turbine 1 shown in FIG. 1 is a Horizontal Axis Wind Turbine (HAWT) as the rotor 4 rotates about a horizontal axis. It should be noted that the rotor 4 may rotate about a vertical axis. Such a wind turbine having its rotor rotates about the vertical axis is known as a Vertical Axis Wind Turbine (VAWT). The embodiments described henceforth are not limited to HAWT having 3 blades. They may be implemented in both HAWT and VAWT, and having any number of blades 6 in the rotor 4.

Figure 2:
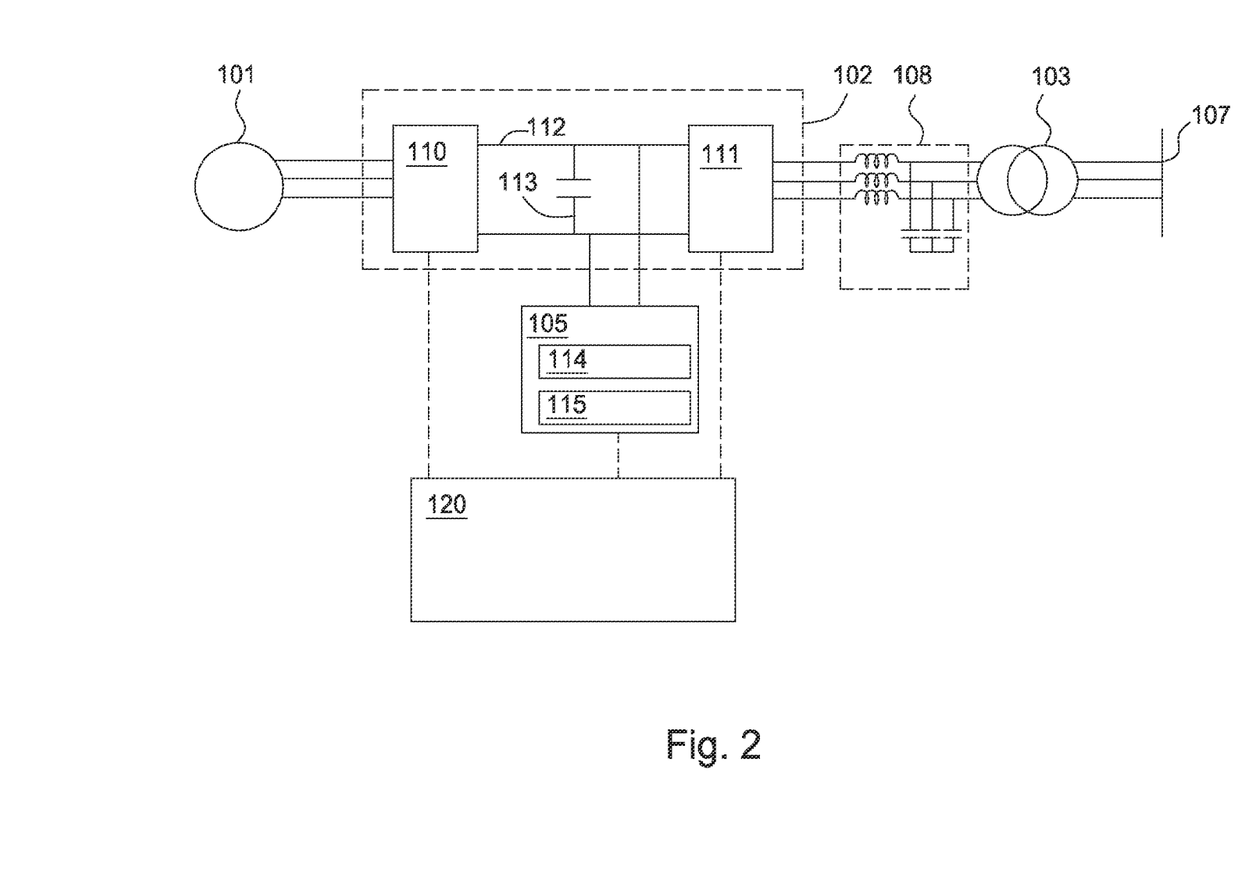
FIG. 2 shows an electrical system layout of the wind turbine with a power dissipating unit.

FIG. 2 shows an electrical system of the wind turbine having a power dissipating unit or a chopper circuit 105 according to an embodiment. The electrical system includes a generator 101, a power converter 102 and a main transformer 103. The electrical system is connected to a power grid 107. The power converter 102 includes a generator-side converter 110 and a grid-side converter 111 connected via a direct current (DC) link 112. The DC-link 112 includes a DC-link capacitor 113. The power dissipating circuit 105 is connected to the DC-link 112. The electrical system also includes grid-side filters 108 for filtering switching harmonics.

The generator 101 converts mechanical energy or power to electrical energy or power having AC voltage and current (collectively referred to as "AC signals"), and provides the generated AC signals to the generator-side converter 110. The AC signals from the generator have a variable frequency, due to varying wind. The generator-side converter 110 converts or rectifies the AC signals to DC voltage and current (collectively know as "DC signals") which are placed on the DC-link 112. The grid-side converter 111 converts the DC signals on the DC-link 112 into fixed frequency AC signals for the power grid 107. The power comprising the fixed frequency AC signals at the output of the grid-side converter 111 is stepped up by the main transformer 103 into a level suitable to be received and transmitted by the power grid 107. The operation of the generator-side converter 110 and the grid-side converter 111 is controlled by a controller 120.

The power dissipating circuit 105 is connected to the DC-link 112 and is adapted to dissipate power at the DC-link 112. The power dissipating circuit 105 includes at least one switch 114 and a plurality of chopper resistors 115. The operation of the power dissipating circuit 105 is controlled by activating the switch 114. When the switch 114 is closed, power at the DC-link 112 is dissipated by the chopper resistors 115. The activation of the switch 114 and hence the operation of the power dissipating circuit 105 is controlled by the controller 120.

It should be noted that FIG. 2 is only an illustration of an electrical system in a wind turbine where only common components are shown. The electrical system may include other components such as generator-side filters, sensors, grid and generator breakers/contactors, pre-charge arrangement, etc. In another embodiment, a doubly-fed induction generator (DFIG) may be used wherein the stator windings of the generator are connected to the grid via the turbine transformer, and the rotor windings of the generator is connected to the turbine transformer via a power converter system. The power dissipating circuit 105 may only have one resistor instead of a plurality of resistors. The power dissipating circuit 105 may also include other dissipating units suitable for dissipating power.

Figure 3:
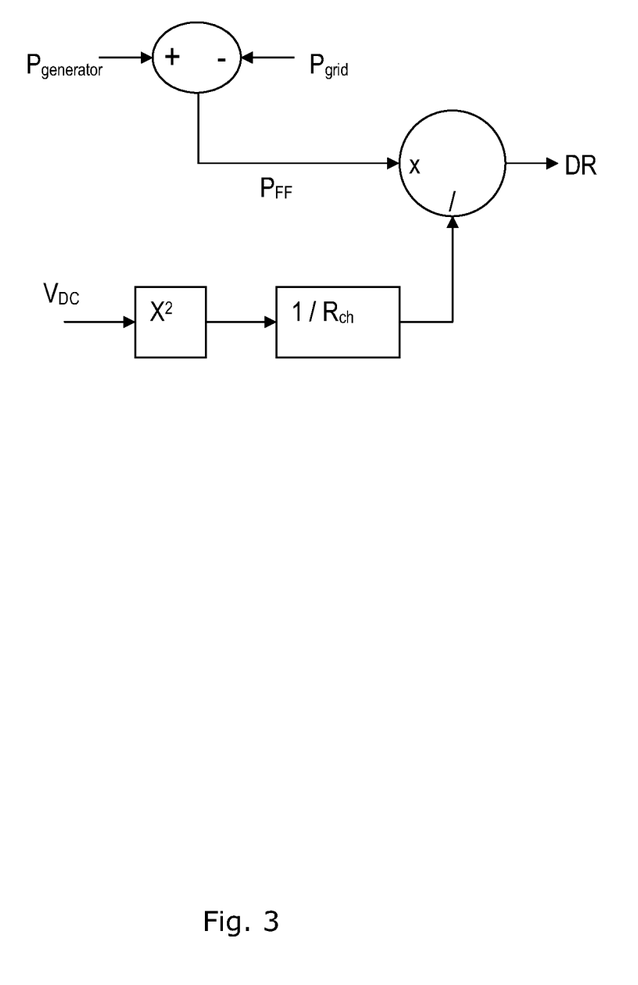
FIG. 3 shows a control algorithm for operating the power dissipating unit according to an embodiment.

FIG. 3 shows a control algorithm for operating the power dissipating circuit 105 according to an embodiment. This control algorithm may be implemented in the controller 120 of the wind turbine. The output of this control algorithm is a duty ratio for activating the switch, and hence controlling the operation of the power dissipating circuit 105. The control algorithm may be activated to control the power dissipating circuit 105 when there is a request to shut down the turbine.

In the control algorithm of FIG. 3, the difference between the reference generator power $P_{generator}$ and the desired turbine power $P_{grid}$ is obtained as the feed forward power signal. Specifically, the desired turbine power is subtracted from the reference generator power as illustrated below:

$$P_{FF} = P_{generator} - P_{grid} \quad (1)$$

where $P_{FF}$ is the feed forward power signal, $P_{generator}$ is the reference generator power and $P_{grid}$ is the desired turbine power.

The reference generator power $P_{generator}$ is the instantaneous power of the generator output when the generator is shutting down. It can be determined from the reference power ramp down rate of the generator or measure directly the instantaneous power output of the turbine. The desired turbine power is the instantaneous power of the turbine output based on a desired turbine ramp down rate during a shut down. The feed forward power signal $P_{FF}$ is the amount of power to be dissipated by the power dissipating circuit 105 in order to achieve the desired power ramp down rate of the turbine.

The maximum power that can be dissipated by the power dissipating circuit 105 is determined as follows:

$$P_{max} = \frac{V_{dc}^2}{R_{ch}} \quad (2)$$

where $P_{max}$ is the maximum power that can be dissipated by the resistor or resistor bank in the power dissipating circuit 105 at the DC-link voltage $V_{dc}$, and $R_{ch}$ is the resistance of the resistor in the power dissipating circuit 105. The resistance value $R_{ch}$ of the resistor is normally selected such that the $P_{max}$ is larger than an anticipated maximum power that may need to be dissipated. In an embodiment, the value of $R_{ch}$ is chosen such that $P_{max}$ is about 10-20% larger than the nominal power rating of the turbine. The maximum power $P_{max}$ may also be changed by changing the value of the DC-link voltage $V_{dc}$.

At a given voltage $V_{dc}$, the duty ratio for operating the power dissipating circuit 105 is determined as the ratio between the power to be dissipated $P_{FF}$ and the maximum power $P_{max}$, that is:

$$DR = \frac{P_{FF}}{P_{max}} \quad (3)$$

where DR is the duty ratio. Since the power to be dissipated $P_{FF}$ in order to obtain the desired turbine ramp down rate is always less than the maximum power $P_{max}$, the duty ratio has a value from 0 to 1.

Figure 4:
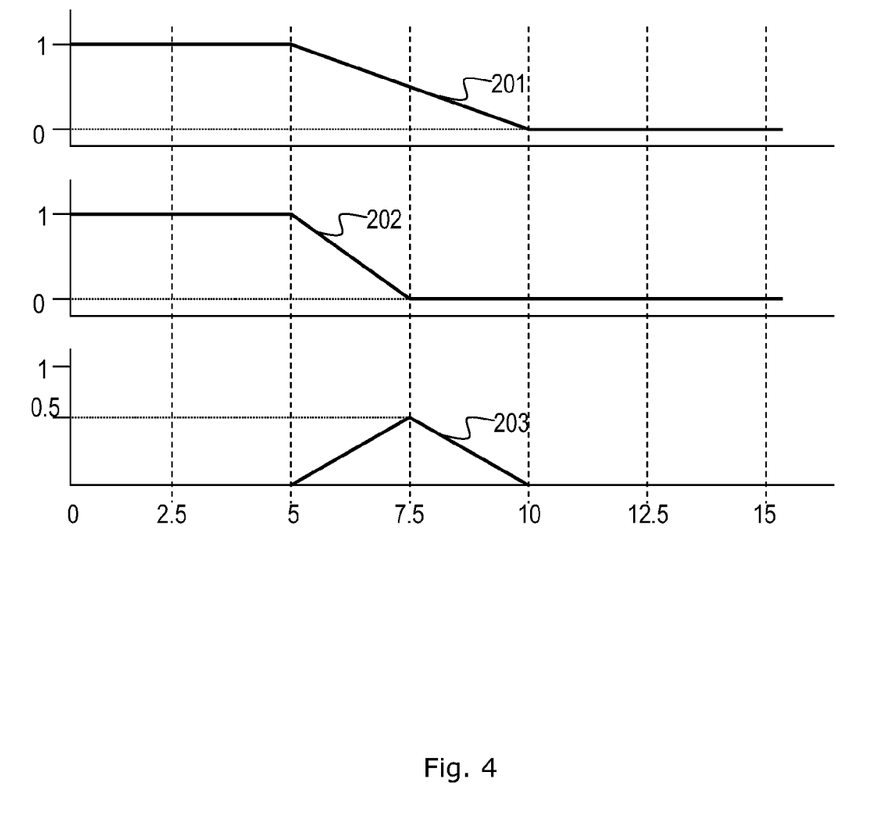
FIG. 4 illustrates various parameters of the wind turbine during the operation of the power dissipating unit according to an embodiment.

FIG. 4 shows illustrates the different parameters of the wind turbine during the operation of the power dissipating unit according to an embodiment. The first graph 201 shows the value of the reference generator power from time t=0 second to t=15 second. The second graph 202 shows the value of the desired turbine power having a desired power ramp down rate. The third graph 203 shows the value of the duty ratio. The first, second and third graphs 201, 202, 203 are all on the same time-scale.

It can be seen from the first graph 201 that the generator is only able to ramp down the power from 1 pu (per unit) to 0 pu in 5 s (from t=5 s to t=10 s). Before t=5 s the duty ratio is 0, and the power dissipating circuit 105 is not activated to dissipate any power. At t=5 s, there is a request to shut down the turbine with a power ramp down within 2.5 s (similar to the profile shown in the second graph 202). Hence at t=5 s, the computation of the feed forward power signal $P_{FF}$ starts by subtracting the desired turbine power $P_{grid}$ (graph 202) from the reference generator power $P_{generator}$ (graph 201).

At 5 s<t<7.5 s, it can be seen that the desired turbine power $P_{grid}$ decreases at a faster rate than the reference generator power $P_{generator}$, resulting in an increase in the difference between the two power values. Accordingly, the feed forward power signal $P_{FF}$ increases. This results in the duty ratio for operating the power dissipating circuit 105 to increase. At 7.5 s<t<10 s, the desired turbine power has already decreased to zero but the generator power $P_{generator}$ is still decreasing in value. Hence the feed forward power signal $P_{FF}$ also decreases, resulting in the duty ratio to decrease. However during this period, the power dissipating unit 105 is still operating to dissipate power to ensure that turbine power output remains at zero since there is still power from the generator. At t=10 s, the duty ratio is zero as both the generator power and the turbine power have reached zero and there is no need to dissipate any power to bring the desired turbine power to zero.

Accordingly, it can be seen that the control algorithm for the power dissipating circuit 105 according to the embodiment has allowed the turbine to achieve a fast ramp down rate as shown in graph 202, which is faster than the ramp down rate of the generator. In FIG. 4, the desired turbine power was ramped down from 1 pu to 0 pu. It should however be noted the invention is not limited to reducing or ramping down the turbine output power from 1 pu to 0 pu. According to an embodiment, the turbine power may be ramped down from X pu to Y pu, where Y has a lower value than X. It should also be noted that the ramp down rate of the turbine power (i.e. graph 202) need not be twice as fast as the reference generator power output (i.e. graph 201). The turbine power may be reduced to 0 pu within 1 second or within other time periods in other embodiments, depending on system or grid requirements.

Figure 5:
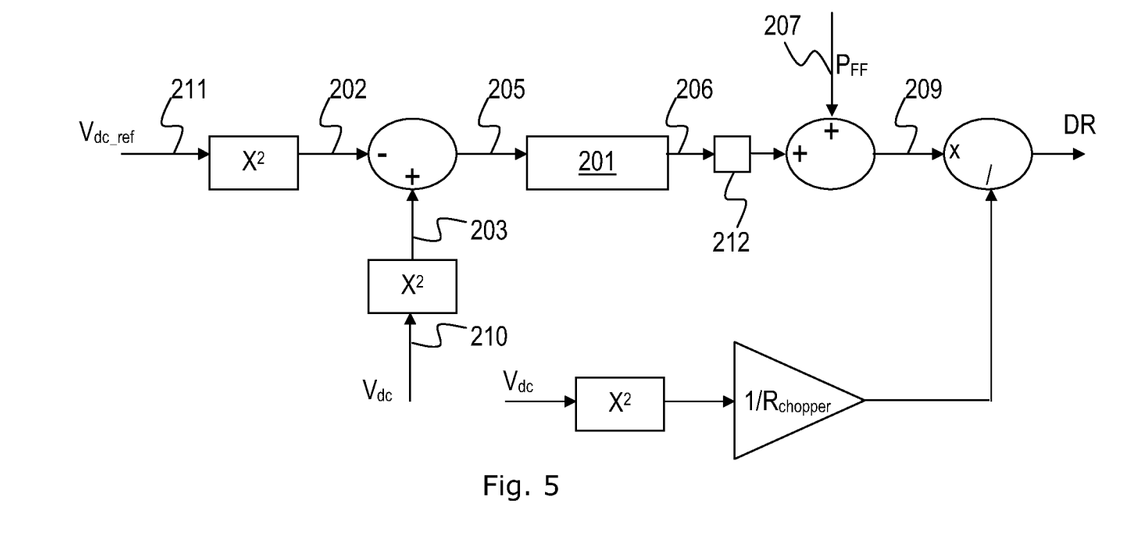
FIG. 5 shows a control algorithm for operating the power dissipating unit according to an embodiment.

FIG. 5 shows a control algorithm for controlling the operation of the power dissipating circuit 105 according to another embodiment. In the control algorithm of FIG. 5, a reference DC-link voltage $V_{dc\_ref}$ 211 and an actual DC-link voltage $V_{dc}$ 210 are obtained. Both the reference DC-link voltage $V_{dc\_ref}$ and the actual DC-link voltage $V_{dc}$ are subsequently squared in this embodiment. The difference between the squares of the actual DC-link voltage 203 and the reference DC-link voltage 202 is obtained as a DC-link error voltage squared 205. A PI (Proportional Integral) controller 201 receives the DC-link error voltage 205 as input and outputs a DC-link error power 206. A limiter 212 is used to limit the value of the DC-link error power 206 to zero if the DC-link error power 206 has a negative value. According to an embodiment, the control algorithm further includes determining the feed forward power signal $P_{FF}$ 207. As described earlier, the feed forward power $P_{FF}$ is the difference between the reference generator power and the desired turbine power.

The total power $P_{total}$ to be dissipated 209 is the sum of the DC-link error power 206 and the feed forward power $P_{FF}$. Similar to the control algorithm described in FIG. 3, the maximum power that can be dissipated by the power dissipating circuit can be determined using equation (2).

The duty ratio for operating the power dissipating circuit is determined as the ratio between the total power to be dissipated $P_{total}$ and the maximum power $P_{max}$, that is:

$$DR = \frac{P_{total}}{P_{max}} \quad (4)$$

where DR is the duty ratio. Since the total power $P_{total}$ is always less than the maximum power $P_{max}$, the duty ratio has a value from 0 to 1.

Under normal conditions, the voltage at the DC-link is regulated by a DC-link controller to a preset DC-link voltage. The preset DC-link voltage is the voltage level which is maintained at the DC-link under normal conditions. The reference DC-link voltage $V_{dc\_ref}$ 211 is predefined or set to a value which is higher than this preset DC-link voltage. Therefore under normal conditions, the DC-link error power 206 is negative as the DC-link voltage 210 (which is regulated to the preset DC-link voltage) has a value lower than the reference DC-link voltage 211. This negative value of the DC-link error power 206 is then limited to zero by the limiter 212. Since the feed forward power will be approximately zero (unless the turbine has been instructed to shut down), $P_{total}$ is also zero. Accordingly, the duty ratio is zero and the chopper circuit 105 is not activated.

When the turbine is instructed to shut down, the feed forward power $P_{FF}$ becomes non-zero. This results in the total power $P_{total}$ to become non-zero. Therefore, the duty ratio will now have a non-zero value between 0 and 1. Depending on the reference generator power and the desired turbine power, the duty ratio may follow the profile shown in the third graph 203 of FIG. 4. A non-zero value of the duty ratio causes the power dissipating circuit to be activated, thereby dissipating power through the DC-link. For example when the duty ratio has a value of 0.5, the chopper circuit is activated or turned on for 50% of the time in one duty cycle. Accordingly, the turbine output power can be ramped down at a desired rate.

It is also possible to have an enable signal which enables the control algorithm to take into account the feed forward power signal only when the enable signal has been detected. This enable signal may only be generated upon detection of a turbine shut down signal. When this enable signal is not detected by the control algorithm, the feed forward power signal is ignored by the control algorithm and the power dissipating unit is only activated based on the DC-link voltage $V_{dc}$. This increases the robustness of the control algorithm.

The control algorithm of FIG. 5 has been described with reference to the full scale converter based turbine shown in FIG. 2. It should be noted that the control algorithm described with reference to FIG. 5 is also applicable in a DFIG system. In the full scale converter based turbine shown in FIG. 2, the power transferred by the grid side converter 111 is approximately the same as the power supplied to the grid 107 if any power losses between the output of the grid side converter 111 and the grid 107 is assumed to be negligible. Similarly, the power supplied to the generator side converter 110 is approximately the same as the power generated from the generator 101, assuming negligible power losses between the output of the generator 101 and the generator side converter 110. In a DFIG system, the power supplied to the grid is the sum of the power transferred by the grid side converter 111 and the power transferred through the stator windings. It should also be noted that the PI controller 201 may also be replaced with a P (Proportional) controller or a PID (Proportional Integral Derivative) controller in other embodiments.

Figure 6:
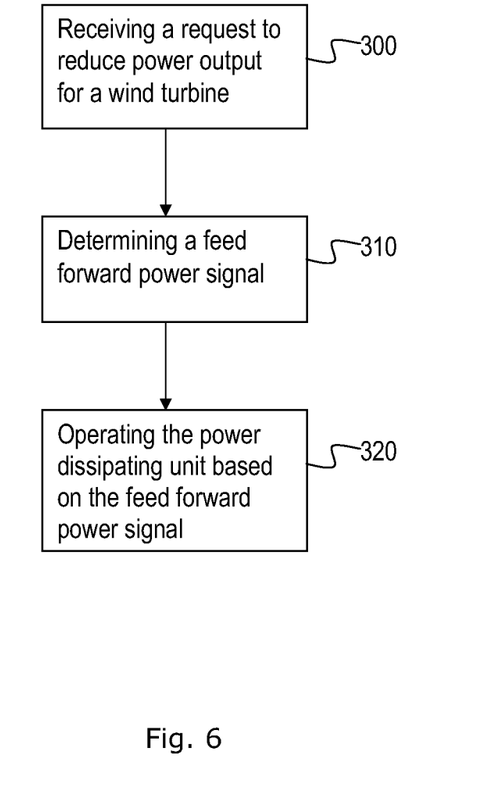
FIG. 6 shows a flow-chart of a method for operating the power dissipating unit in the wind turbine according to an embodiment.

FIG. 6 shows a flow-chart of a method for operating the power dissipating unit in the wind turbine according to an embodiment. Step 300 includes receiving a request to reduce or ramp down power output from a wind turbine. The request to reduce power output may be a request to shut down the wind turbine.

Step 310 includes determining the feed forward power based on the reference generator power and the desired turbine power. In an embodiment, the feed forward power signal is determined based on the difference between the reference generator power and the desired turbine power. Step 320 includes operating the power dissipating unit based on the feed forward power signal. In an embodiment, the duty ratio is used to operate the power dissipating unit. The chopper circuit as described with reference to FIG. 2 earlier is an example of the power dissipating unit. In an embodiment, the duty ratio is the ratio between the power to be dissipated by the power dissipating unit and the maximum power the power dissipating unit can dissipate. The power to be dissipated is the sum of the DC-link error power and the feed forward power signal in an embodiment. Steps 300 to 320 are then repeated, so that the duty ratio is constantly being updated.

It should be emphasized that the embodiments described above are possible examples of implementations which are merely set forth for a clear understanding of the principles of the invention. The person skilled in the art may make many variations and modifications to the embodiment(s) described above, said variations and modifications are intended to be included herein within the scope of the following claims.

The invention claimed is:

1. A variable speed wind turbine comprising:
   a generator;
   a power converter for converting at least a portion of electrical power generated by the generator, the power converter comprising a generator-side converter, a grid-side converter and a DC (direct current) link therebetween;
   a power dissipating unit operatively coupled to the DC-link; and
   a controller, wherein the controller is adapted to:
      receive a request to shut down the wind turbine;
      determine a feed forward power signal from the difference between a reference generator power and a desired turbine power, wherein the reference generator power is derived from a predefined ramp down power profile of the generator, and the desired turbine power is derived from a desired ramp down power profile; and
      operate the power dissipating unit by determining a duty ratio for activating the power dissipating unit, wherein the controller is adapted to generate the duty ratio by:
      determining a power to be dissipated by the power dissipating unit based on the feed forward power signal such that the power output from the wind turbine is decreased at a desired rate;
      determining a maximum power that can be dissipated by the power dissipating unit; and
      determining the ratio of the power to be dissipated and the maximum power, thereby obtaining the duty ratio.

2. A variable speed wind turbine of claim 1, wherein the power dissipating unit comprises at least a switch and one resistor.

3. A variable speed wind turbine of claim 1, wherein the power dissipating unit is directly coupled to the DC-link.

4. A variable speed wind turbine of claim 1, wherein the predefined power ramp down power profile is at least one of received from a manufacture of the generator and derived using prior experiments to determine a ramp rate of the generator.

5. A variable speed wind turbine of claim 1, wherein the feed forward power signal is the amount of power to be dissipated by the power dissipating unit in order to achieve the desired rate.

6. A method of operating a wind turbine having a generator, a power converter and a power dissipating unit, the power dissipating unit being operatively coupled to the power converter for converting at least a portion of electrical power generated by the generator, and the method comprising:
   receiving a request to shut down the wind turbine;
   determining a feed forward power signal from the difference between a reference generator power and a desired turbine power, wherein the reference generator power is derived from a predefined ramp down power profile of the generator, and the desired turbine power is derived from a desired ramp down power profile; and
   operating the power dissipating unit by determining a duty ratio for activating the power dissipating unit, wherein the duty ratio is determined by:
      determining a power to be dissipated by the power dissipating unit based on the feed forward power signal such that the power output from the wind turbine is decreased at a desired rate;
      determining a maximum power that can be dissipated by the power dissipating unit; and
      determining the ratio of the power to be dissipated and the maximum power, thereby obtaining the duty ratio.

7. A method of claim 6, wherein the power dissipating unit is directly coupled to a DC-link in the power converter.

* * * * *